Dec. 1, 1942.   T. O. SUMMERS, JR   2,303,799
GROUND SPEED INDICATOR
Filed Sept. 26, 1940   5 Sheets-Sheet 2

Fig. 2.

INVENTOR.
THOMAS O. SUMMERS JR.
BY
ATTORNEY.

Dec. 1, 1942.  T. O. SUMMERS, JR  2,303,799
GROUND SPEED INDICATOR
Filed Sept. 26, 1940  5 Sheets-Sheet 4

INVENTOR.
THOMAS O. SUMMERS JR.
BY
Stuart M. Maule
ATTORNEY.

Patented Dec. 1, 1942

2,303,799

UNITED STATES PATENT OFFICE 2,303,799

GROUND SPEED INDICATOR

Thomas O. Summers, Jr., Los Angeles, Calif.

Application September 26, 1940, Serial No. 358,543

4 Claims. (Cl. 33—204)

This invention relates to navigational instruments, and more particularly to an instrument of this general class employing a gyroscope as an essential portion thereof.

One object of my invention is to provide a gyroscopic instrument which functions independently of any movements on the part of the medium being traversed by the instrument's carrier, to give at all times an indication of the speed of the instrument's carrier relative to a fixed or constantly moving object. Such an instrument is especially useful in the navigation of both aircraft and water craft for the reason that it is capable of giving a direct and continuous reading of the speed at which the craft is moving relative to the ground, any movement on the part of the craft's supporting medium (air or water) being entirely immaterial and of no consequence.

A more detailed object of the present invention is to provide a gyroscopic ground speed indicating instrument of the above mentioned type, which is highly sensitive to accelerations affecting the speed of the instrument's carrier in its direction of travel, and which utilizes the principle of summing up and registering these accelerations as they occur.

A still more detailed object in this connection is to provide a gyroscopic ground speed indicating instrument in which the acceleration-sensitive portion is made sensitive by being pendulously supported and therefore is urged to swing whenever the instrument's carrier is subjected to an acceleration, and wherein the pendulously supported structure also is so interconnected with the gyro's rotor-bearing casing that the casing is urged to turn therewith, thus causing the gyro to precess proportionally with the acceleration to which the pendulous structure has responded, with the purpose in view of providing properly calibrated means for measuring the extent of the gyro's precession so as to make available a direct reading of the carrier's attained velocity.

Another important object is to provide means for making the acceleration-sensitive portion of the instrument of my invention insensitive to gravity.

A more detailed object in this connection is to associate a mobile, gravity-controlled gyroscope, or gyro vertical construction with the acceleration-sensitive portion in such a manner that the acceleration-sensitive portion is allowed to move only in a vertical plane which is normal to the horizontal line of travel of the instrument's carrier.

A gyro vertical instrument of the type which I have found to be most suitably adaptable to the ground speed indicating instrument of the present invention, is the type employing a gravity-operated erecting mechanism, the function of which when adapted to the ground speed indicating instrument of the present invention, is to cause a torque, usually an air-jet torque, to be imposed upon the gyro in such a manner that there results a corrective, toward-vertical precession whenever the acceleration-sensitive portion becomes displaced from the vertical plane to which its movements are sought to be confined. However, such a mechanism is conducive to acceleration-error, since it is impossible to arrange the mechanism so that it will be sensitive to the vertically acting forces of gravity, and yet insensitive to horizontally acting forces caused by accelerations of the instrument's carrier. Indeed, whenever the instrument's carrier is accelerated, the air-jet torque actually produces an erroneous, from-vertical precession. Hence, acceleration-error is governed by the value of the air-jet torque employed; that is, the lower the air-jet torque, the lower the precession rate, and hence, the lower the acceleration-error. Nevertheless, it is necessary to make this torque sufficiently great to overcome the gyro's pivotal bearing friction, which is highly variable due to temperature and other changes the instrument experiences while in operation, and due to the fact that this friction is at times static and at other times kinetic. In fact, in order to make the instrument fully dependable, it must be designed to deliver an air-jet torque sufficiently great to overcome most positively, any possible value the gyro's pivotal bearing friction might assume even under the most extraordinary circumstances; even though this precautionary measure is conducive to a high precession rate, and therefore, high acceleration-error.

I find, however, that the precession rate and therefore the acceleration-error can be reduced to a new low merely by reducing the time that the torque is permitted to act, rather than by attempting a dangerous reduction of the torque itself; hence, another object of the present invention is to provide a gyro vertical construction including a simple precession-retarding device to interrupt the air-jet torque at recurrent intervals, thereby reducing acceleration-error.

Another object in this connection is to provide a gyro vertical construction in which the precession-retarding device is so simple that it may be mounted directly upon the rotor bearing casing of the gyro vertical and which, therefore, lends itself most advantageously to compact, unitary construction.

An additional object of the present invention is to provide a ground speed indicating instrument of the character described, of greatly simplified construction as compared with prior devices (such as the navigational instrument forming the subject matter of my co-pending application, Serial No. 258,931, filed February 28, 1939), and one wherein this very simplification, and the consequent reduction in the number and complexity of its moving parts, are in themselves also responsible for increased accuracy of the device, in addition to the advantage that they reduce the cost of manufacture and increase its durability and dependability.

The invention possesses other objects and advantageous features, some of which, with those enumerated, will be set forth in the following description of the preferred embodiment of my invention illustrated in the drawings accompanying and forming part of the specification. It is to be understood that I do not limit myself to the showing made by the said drawings and description as I may adopt variations of the preferred form within the scope of my invention as set forth in the claims.

Referring to the drawings.

Specifically describing that embodiment of my invention which has been chosen for illustration and description, it comprises a housing indicated in its entirety at 11 and made up of a preferably cylindrical casing 12 closed at its forward and after ends by caps 13 and 14 respectively. These caps are retained in position in any suitable manner such as by screws 16; the engagement between the caps and the casing however, being airtight, inasmuch as it is preferred that the gyroscope which forms an important portion of the device is to be driven by air pressure and a convenient manner of accomplishing this is by exhausting air from the housing 11 so that air at atmospheric pressure will flow into the housing, means being provided to direct this inwardly flowing air against the rotor of the gyroscope in such a manner as to produce its rotation. Accordingly an exhaust tube 17 communicates with the interior of the housing 11, preferably through the after cap 14, it being undertsood that any suitable means may be employed for coupling the exhaust to a vacuum pump, venturi, or other source of negative air pressure.

The rotor bearing casing 21 of the gyroscope 22 is mounted within the housing 11 upon suitable gimbals indicated in their entirety at 23 and comprising an outer gimbal ring 24 journaled for free rotation about an axis extending longitudinally of the instrument and therefore parallel to the direction of travel of the instrument's carrier, through the expedient of cooperating axial pins 26 and 27 engaged within the bearings 28 and 29 respectively, suitably mounted in the forward and after caps 13 and 14 respectively. The inner gimbal ring 31 is supported in the outer ring 24 for free rotary motion about an axis normal to the axis of the outer ring 24 through the expedient of cooperating axial pins 32 and anti-friction bearings 33.

The after-bearing 29 is enclosed within an auxiliary cap 36, the outer end of which has an opening 37 therein, covered by a suitable air filter 38. The bearing 29 is also enclosed within a dome 39 having a chamber 41 therein with which a plurality of intake orifices 42 communicate. The after-pin 27 of the outer gimbal ring 24 is provided with preferably a plurality of longitudinally extending passages 43, the outer ends of which communicate with the chamber 41; and the inner ends of the passages 43 communicate with the passage 44 formed in the gimbal ring 24 and of such form that it communicates with an annular chamber 46 surrounding one of the axial pins 32 of the inner gimbal ring 31. In a manner similar to that of the construction of the pin 27, the pin 32 also is formed with a plurality of longitudinally extending passages 48 which establish communication between the annular chamber 46 and the manifold passage 49, which in turn communicates with a plurality, preferably two, nozzles 51 so disposed that they direct their respective jets substantially tangentially against the buckets 52 formed in the periphery of the rotor 53 of the gyro. Thus it may be seen that all the air entering the instrument is first strained through the filter 38 and then conducted by the passages described, to the nozzles 51 by which it is directed against the rotor in such a manner as to cause rotation of the latter.

The rotor 53 of the gyro 22 is mounted for free rotation within the rotor bearing casing 21 about an axis normal to the axis of the inner gimbal ring 31. This is most easily accomplished through the expedient of an axial shaft 56 which carries the rotor 53 and which is mounted at its ends in suitable anti-friction bearings 57.

After the air has been directed in the manner described against the buckets 52 of the rotor 53, it is exhausted from the interior 61 of the rotor bearing casing and conducted to the erecting mechanism indicated in its entirety at 62, which it also is relied upon to operate. Inasmuch as it is desirable that the inner gimbal ring 31 and its entire load will be pendulous, as will be explained hereinbelow, it is convenient to enclose the erecting mechanism 62 within a suitably formed block 63 of such proportions that it serves as a ballast for the inner gimbal ring 31, by lowering the center of gravity of the inner gimbal and its load. The air leaving the interior chamber 61 of the rotor bearing casing is conducted to the erecting mechanism 62 by means of preferably a plurality of passages 66 formed in this ballast block.

The passages 64 lead to a chamber 71 within the ballast block 63 across which a shaft 72 extends to support a rotor 73 for rotation. The rotor 73 is rigid with the shaft 72 so that they rotate together, the purpose being to assure rotation of the discs 74, one of which is affixed to each end of the shaft 72 outside of the ballast block 63. A plurality of buckets 76 are formed in the periphery of the rotor 73 and preferably two of the passages 64 are disposed in opposition to each other and direct their jets substantially tangentially on to the rotor 73 so that the air emerging from the chamber 61 will thus be employed to cause rotation of the rotor 73 and its associated discs 74. Each of the discs 74 is formed with one or more apertures 77 preferably in the form of peripheral notches with the result that as the discs turn, they alternately interpose their notches 77 and the solid portions 78 between their notches before discharge orifices 79 in the sides of the ballast block 63. It is these orifices through which the air must leave the chamber 71 after it is impinged upon the rotor 73; hence the effect of the rotating discs 74 is to interrupt the jets of air flowing from the nozzles 79 preferably at regular intervals, for a purpose to be explained hereinbelow.

Means are provided for restricting the speed of rotation of the rotor 73 and the discs or jet-cutters 74. This is desirable for the reason that the force of the jets issuing from the passages 64 should be sufficient to start the rotor and discs in rotation and bring them up to the desired rotational speed within a reasonably short time; but in the absence of any means for limiting or restricting their speed, the use of jets of such force would cause the rotor to turn at too high a speed, or "run away" after its starting inertia has been overcome, because, in the absence of any drag upon a turbine rotor, its tendency is to increase its rotational speed until its peripheral speed is equal to the jet velocity. A very simple and yet efficacious manner of so restricting the running speed of the discs 74 is by associating a permanent magnet 80 with preferably each of the discs 74, each magnet 80 being mounted upon the block 63 in such position that its opposed poles embrace an edge of the associated disc 74. Hence, each disc 74, which should be constructed of suitable electrically conductive material, such as aluminum or copper, turns in a plane substantially perpendicular to the magnetic lines of force of its associated magnet 80, which lines it cuts as it turns. Consequently, the magnets 80 will exert a drag upon the rotating discs which increases as their rotational speed increases. Being relatively ineffective while the discs are turning at low speed, the magnets will impede but slightly the acceleration of the discs as they are being brought up to speed, but they will operate to prevent the discs from turning at too high a speed even though jets of ample force are employed.

Whereas the orifices 79 may be formed directly in the material of which the ballast block 63 is constructed, they may, for the purpose of convenience of manufacture, be formed in separate blocks 81, adapted to be pressed into or otherwise affixed to the block 63 with their ports 79 in communication with discharge passages 82 which lead laterally from the chamber 71.

Also associated with each of the discharge orifices 79 is a blade or vane 83, each of which is supported upon a shaft 86, the inner end of which bears against a suitable thrust member such as a ball 87, the outer end of which is engaged by an adjustable pivot pin 88. Inasmuch as the vanes 83 lie between the notched discs 74 and the sides of the block 63, the vanes are provided with notches 91 adapted to clear the shaft 72 which carries the discs 74. Furthermore, inasmuch as the movement of the vanes is produced solely by exceedingly small components of gravitational force acting thereon, it is desirable that their means of support be so designed that they can move with the utmost freedom.

Whereas the ballast block 63 serves to lower the center of gravity of the inner gimbal ring 31 so that the inner ring and its load are definitely pendulous, the outer gimbal ring 24 is provided with a suitable counter-balance 92 of such design that the outer gimbal ring and its entire load are supported in neutral equilibrium so as to be insensitive to the forces of gravity and acceleration in that transverse, vertical plane which includes the rotor's axis of spin.

Affixed to the forward end of the forward axial pin 26 of the outer gimbal ring 24 is a pointer or indicating hand 101 which is thus caused to move over the face of a stationary dial 102, through the same angular displacement as the outer gimbal ring 24 when it turns upon its axis. For the purpose of measuring the angular movement of the indicating hand 101, the dial 102 is provided with suitably spaced graduations 103 and calibrations 104 associated therewith.

Another dial 106 is movably mounted adjacent the stationary dial 102 and is provided with graduations 107 and calibrations 108 which correspond to those of the stationary dial 102. Inasmuch as the movable dial 106 extends all the way around the periphery of the stationary dial 102, it is in the form of an annulus freely disposed within a substantially complementary recess 109 in the forward face of the associated cap 13 and is retained therein through the expedient of a bezel plate 111 removably secured to the forward cap 13 as by a plurality of screws 112. Means are provided for moving the movable dial 106 to any selected position with respect to the stationary dial 102, such as a knurled knob 113, the shaft 114 of which extends through the bezel plate 111 and carries upon its inner end, means, such as a pinion 116, engaging therewith upon a peripheral edge of the movable dial 106. The bezel plate 111 supports a crystal 117 preferably held in place by a snap ring 118 and through which the end 101 and dials 102 and 106 are visible.

Also accessible at the front of the instrument is another knurled knob 121, the shaft of which 122 also extends through the bezel plate 111 to receive upon its inner end a preferably bevelled wheel 123, the edge of which is adapted to engage the complementary bevelled edge 124 of a disc 126 carried by and rigid with the forward axial pin 26 of the outer gimbal ring 24. The bevelled wheel 125 is normally held out of contact with the plate 126 by means of a coil spring 127, but permits an operator to press the knob 121 inwards to bring the wheel 125 into contact with the plate 126, whereupon he may, by turning the knob 123, turn the outer gimbal 24 and thereby bring the indicating hand 101 to its zero position with relation to the dials when the instrument is out of operation and it is desired to prepare it for operation.

Figure 1:
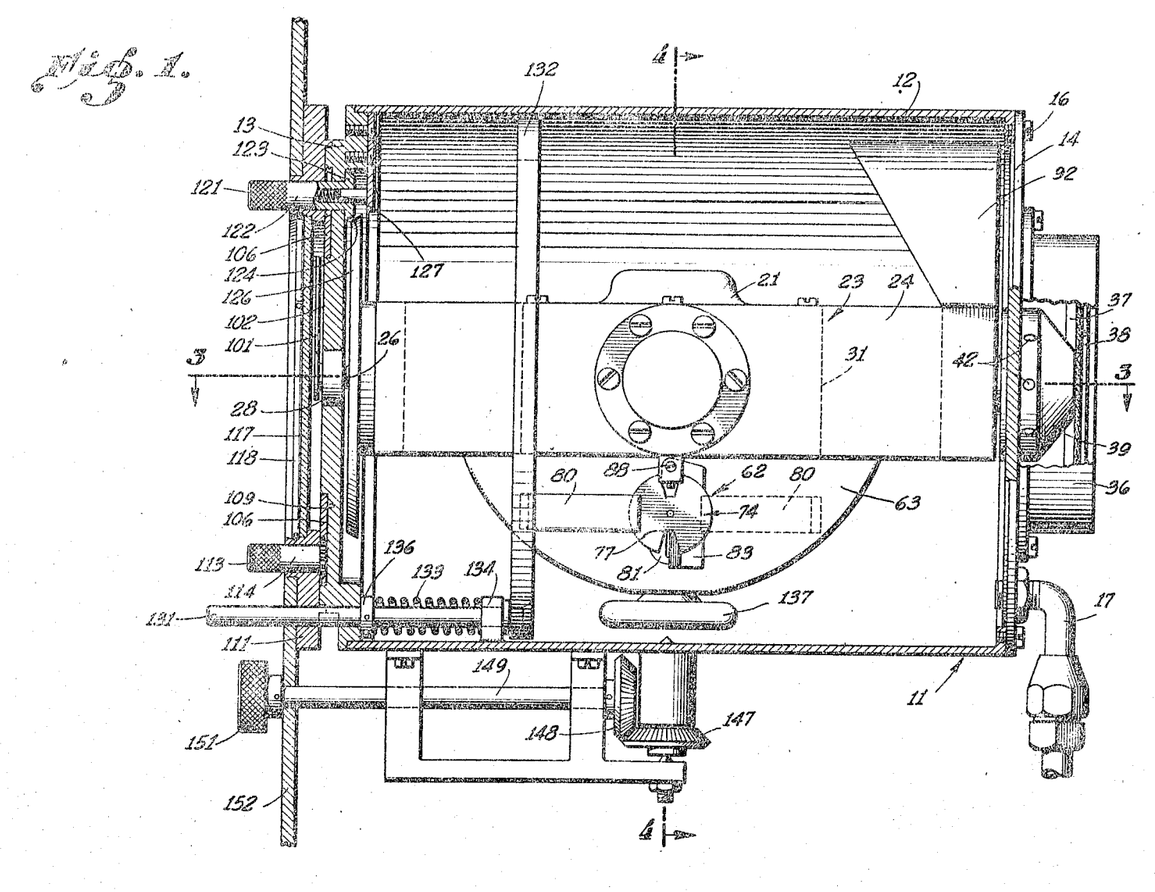
Figure 1 is a longitudinal, vertical, medial sectional view taken through the housing of a ground speed indicator embodying the principles of the present invention, and showing the internal mechanism in side elevation.
Figure 2:
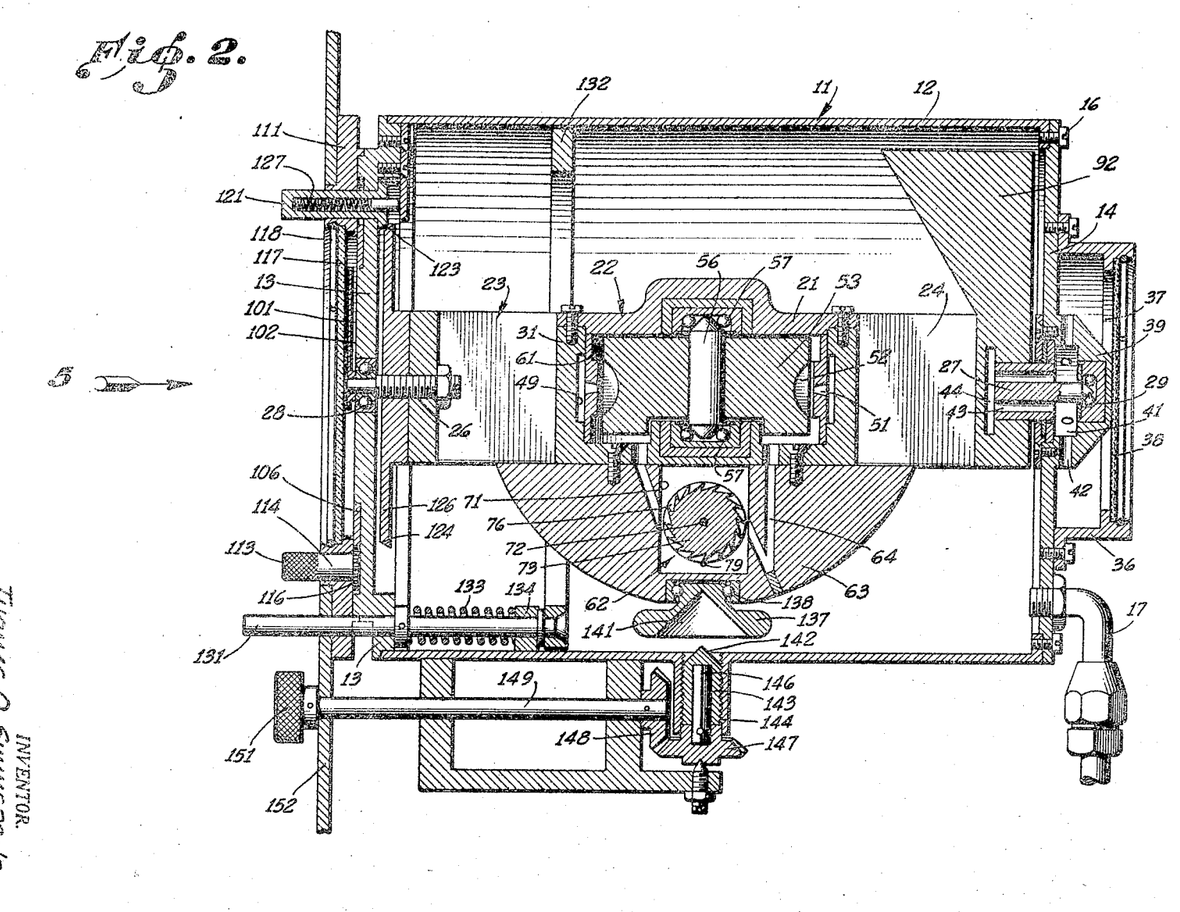
Figure 2 is another longitudinal, vertical, medial sectional view taken through the internal mechanism as well as through the housing.
Figure 3:
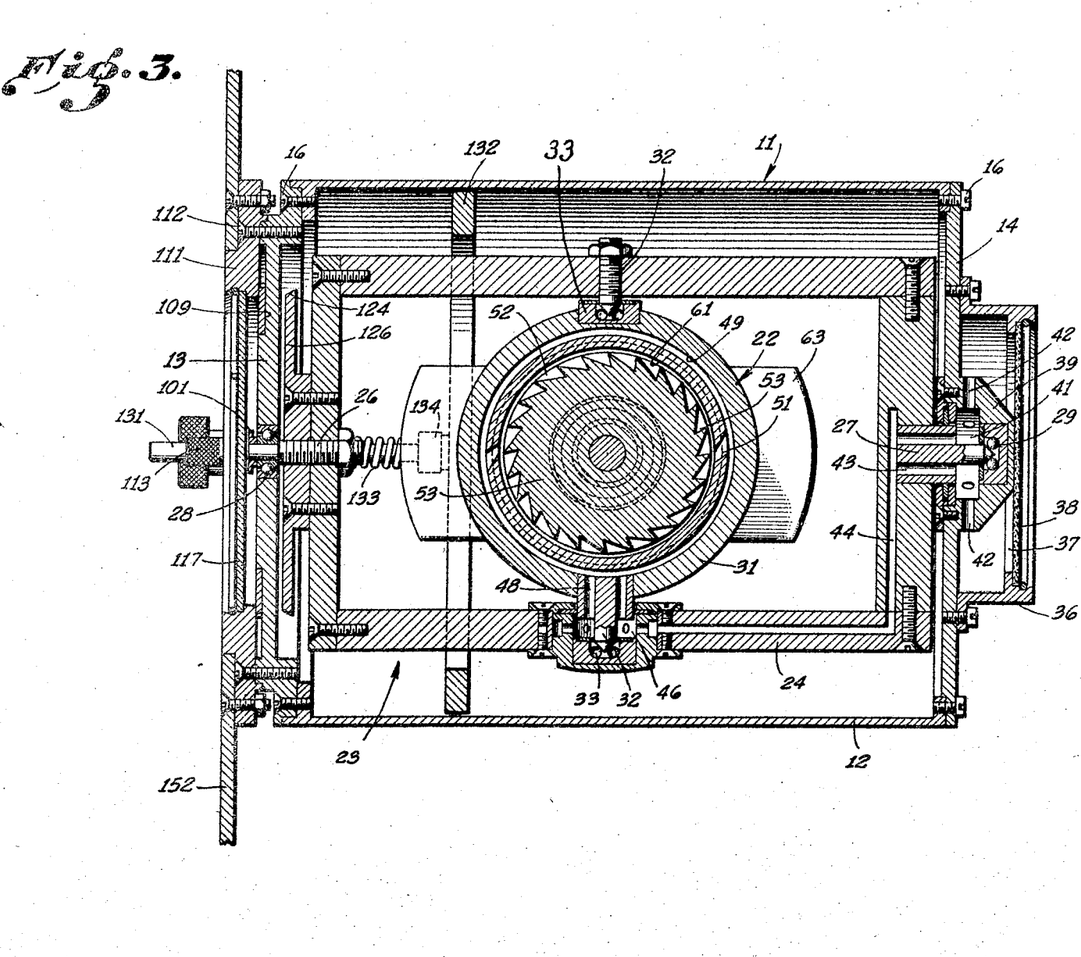
Figure 3 is a longitudinal, medial sectional view, the plane of section being indicated by line 3—3 of Figure 1 and the direction of view by the arrows.
Figure 4:
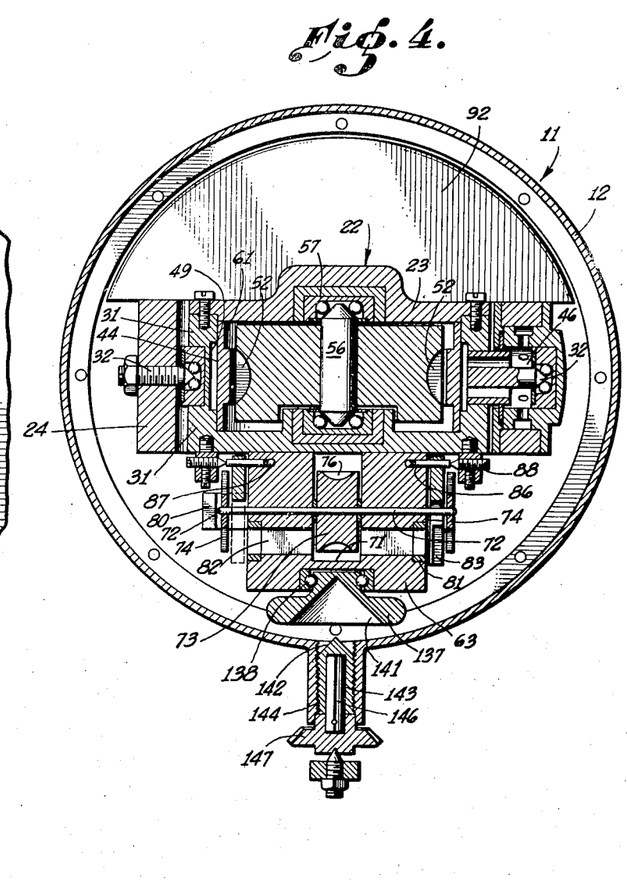
Figure 4 is a transverse, vertical sectional view, the plane of section being indicated by line 4—4 of Figure 1, and the direction of view by the arrows.
Figure 5:
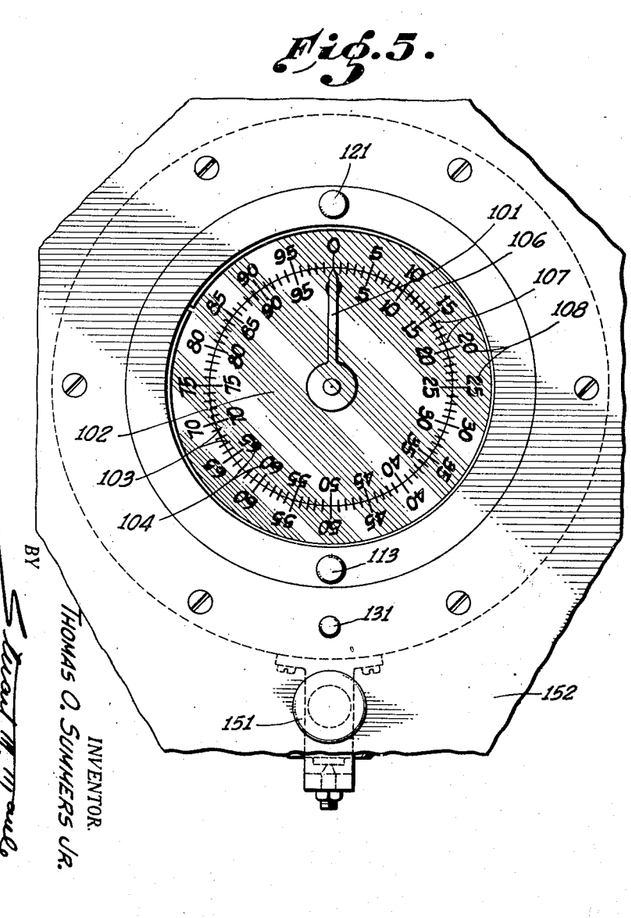
Figure 5 is a view in front elevation showing the appearance which the instrument will present upon the instrument panel. The direction of view is indicated by the arrow 5 of Figure 2.
Figure 6:
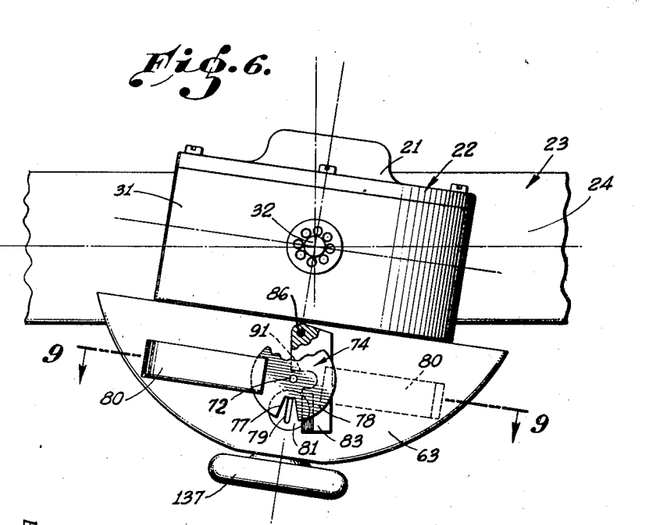
Figure 6 is a view in side elevation of the internal mechanism apart from its containing housing. This view is more or less diagrammatic in that it greatly exaggerates the displacement of the mechanism from its normal position to emphasize the manner in which the erecting mechanism operates.
Figures 7, 8:
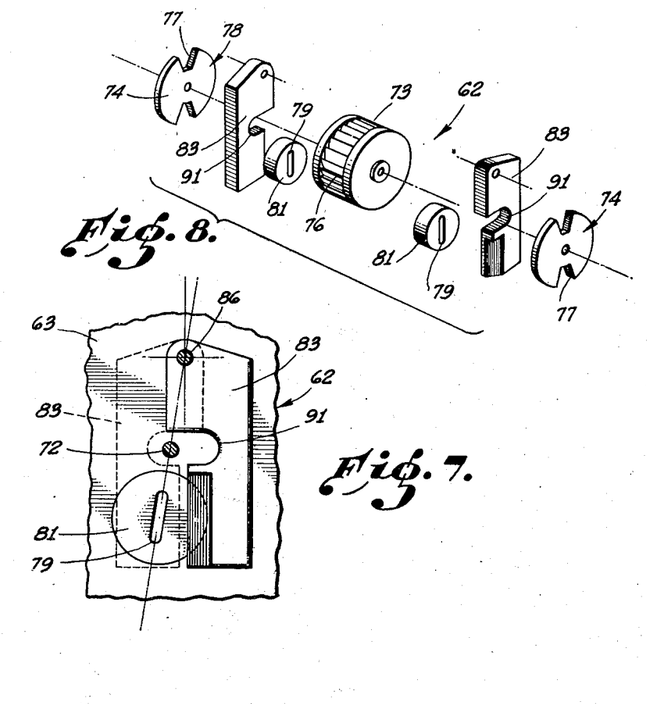
Figure 7 is an enlarged detail view of a portion of the structure illustrated in Figure 6, to illustrate the cooperation between the air-ejecting port and the pendulous vane associated therewith.
Figure 8 is a detail, diagrammatic, exploded view illustrating the parts which cooperate to reduce the precession rate.
Figure 9:
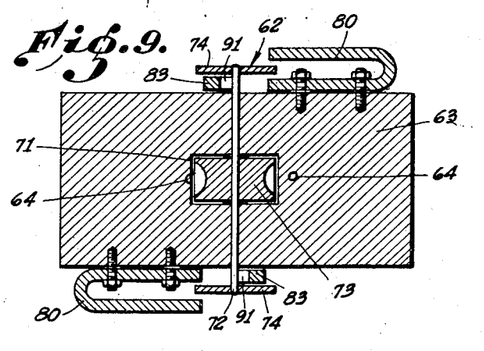
Figure 9 is a transverse sectional view which may be considered a horizontal sectional view taken upon the line 9—9 of Figure 6 with the direction of view as indicated.

Means are also provided for moving the hand 101 during the operation of the instrument, in the form of means for producing an artificial precession. A push rod 131 projects through the forward face of the bezel plate 111 and carries upon its inner end a ring 132, the diameter of which is only slightly less than the inside diameter of the casing 12. A coil spring 133 on the rod 131 is under compression between a guide bracket 134, rigid with the casing 12 and a collar 136 rigid with the rod 131 urges the rod 131 and the ring 132 carried thereby toward the front of the housing 11, but permits the operator by pushing the push rod 131 to carry the ring 132 to the right as viewed upon Figures 1, 2, and 3, to engage the wheel structure 137 revolubly supported as by anti-friction bearings 138 upon the bottom of the ballast block 63 and in this manner impose a thrust upon the structure supported by the inner gimbal ring 31, about its axis of suspension; and inasmuch as the gyro is a portion of the structure carried by the inner gimbal ring, imparting thereto of a thrust as described, will cause the gyro to precess and turn about the axis of the other gimbal ring, i. e., about the major gimbal axis, as long as the thrust is sustained. The fact that the wheel 137 is revolubly supported, facilitates this precessional adjustment, because as the outer gimbal ring turns, the wheel will merely roll over the peripheral face of the thrust ring 132.

Means are also provided for caging the instrument, i. e., locking it so as to prevent any movement about the gimbal axes while the instrument is out of operation and towards this end the wheel 137 is formed with a conical recess 141 in its under surface, adapted to receive the pointed end 142 of a pin 143 threaded in a socket 144 extending vertically downwards from the bottom of the casing 12. A non-circular shaft 146 is slidably disposed within a complementary socket in the lower end of the threaded pin 143, whereas the lower end of the shaft 146 is affixed to a bevelled gear 147, the teeth of which are enmeshed with another bevelled gear 148 carried by a shaft 149 extending forward therefrom to expose a narrow knob 151 on its forward end in accessible position in front of the panel 152 upon which the instrument is mounted; this panel 152 preferably being the instrument panel of the airplane. Turning the knob 151 induces similar rotation of the bevel gear 147 and the pin 143, which, because of its threaded engagement within the socket 144, is thus caused to advance axially, thereby making it possible to project the point 142 of the pin 143 into the socket 141 of the wheel 137 and thereby "anchor" or "cage" the portions of the instrument carried by the gimbals and thereby protect the suspended mechanism against injury while the instrument is inoperative or while the airplane carrying the instrument is performing acrobatic maneuvers.

Theory of operation and design

The instrument is to be mounted in a vehicle, such as an airplane, in such position that the major gimbal axis, i. e., the axis of the pins 26 and 27 and 28, is parallel to the direction of travel, and the minor gimbal axis, or the axis of the pins 33, is perpendicular to the direction of travel. This makes the structure supported upon the pins 33 sensitive to acceleration of the instrument's carrier in a fore and aft direction, due to the pendulous nature of that structure.

Such sensitivity is made manifest by gyroscopic torque imposed upon the gyro casing, since the gyro casing is a portion of the pendulous mass. But, inasmuch as this torque urges the gyro to rotate about the minor gimbal axis, there immediately results a precession of the gyro about the major gimbal axis; and in accordance with the laws of motion, this torque is proportional to the airplane's acceleration, as is also, therefore, in accordance with the laws of gyroscopic action, the rate, $\omega_p$, at which the precession about the major gimbal axis occurs.

This rate, $\omega_p$, however, at which the gyro precesses, and consequently at which the pointer turns is of less interest than the actual angular displacement of the pointer since the instrument is read by observing the point at which the pointer 101 comes to rest, and not by observing its angular velocity. Hence, it is desirable to show the relationship between the pointer's angular velocity, $\omega_p$, and its angular displacement, $\theta$, as follows:

In conventional symbols for any rotary motion $$\theta = \int \omega dt$$

or applying the general low to the present discussion $$\theta = \int \omega_p dt \qquad (A)$$

i. e., the pointer's angular displacement is the time integral of its angular velocity. Therefore, since the angular velocity of the pointer, i. e., the precessional rate of the gyro, is proportional to the ship's acceleration as has already been pointed out, the ultimate position, the distance, through which the pointer moves is proportional to the ship's speed.

Hence, by proper calibration of the dial with relation to which the pointer moves, it is possible to secure a direct reading of the ship's actual forward speed; i. e., its speed in the direction of its longitudinal axis.

It is desirable, of course, that the dial with respect to which the pointer is to be read, shall be calibrated progressively and uniformly throughout, but not necessarily to read in units of $\theta$. Thus, the actual dial reading or registration (R) will be equal to $C\theta$; that is, $$R = C\theta \qquad (B)$$

where C is a constant determined by the ratio of the magnitude of unit $\theta$ to one unit of dial graduation. Hence, by substituting (B) in (A)

$$R = C \int \omega_p dt \qquad (C)$$

The torque imposed upon the gyro when the pendulous mass is acted upon by an acceleration of the ship is $$T = Mlf \qquad (D)$$

where $l$ equals the perpendicular distance from the center of gravity of the pendulous mass M to the axis of its pendulosity, and $f$ equals acceleration acting upon the pendulous mass to produce the torque T.

In symbols acceleration may be shown by $$f = \frac{dv}{dt} \quad (E)$$

and substituting (E) in (D)

$$T = Ml\frac{dv}{dt} \quad (F)$$

As hereinbefore stated the rate $\omega_p$, at which the gyro precesses is proportional to the torque T. Furthermore, $\omega_p$ is inversely proportional to the product of the angular velocity, $\omega_s$, of the gyro rotor 53 and the rotor's moment of inertia, K. In symbols, $$\omega_p = \frac{T}{\omega_s k} \quad (G)$$

whence, $$T = \omega_p \omega_s K$$

Equating (G) and (F)

$$\omega_p \omega_s k = Ml\frac{dv}{dt} \quad (H)$$

and integrating,

The value $$\frac{\omega_s k}{Ml}$$

can readily be expressed as a constant, for the reason that each of its four constituent factors is a constant determined by the actual dimensions of the instrument. Accordingly, the design of the instrument can be so controlled as to fix these four constants; therefore, in order for the dial to register ground speed, matters are arranged so that $$\frac{\omega_s k}{Ml}$$

is equal to C; and, substituting in (H)

$$v = C \int \omega_p dt$$

But according to Equation C, $$R = C \int \omega_p dt$$

and therefore, $$R = v.$$

i. e., the position of the pointer 101 with relation to its dial will give a direct reading of the ship's speed.

Practical operation

For various reasons it is most conducive to satisfactory operation of the instrument of the present invention to have the gyro in such position that its spinning axis is vertical. For instance, with the gyro in this position there is no tendency for the gyro to be caused to precess when the instrument's carrier turns. Consequently, means are provided whereby the gyro may be placed in this ideal position, as for example, the thrust ring 132 which can be slid axially of the housing 11 by operation of the push rod 131; which permits the operator to cause the gyro to precess artificially and thereby move the pointer 101 to any desired position, it being understood that when the hand reaches the position desired the operator has merely to release the push rod 121, whereby the precessional movement of the gyro will cease and the pointer will come to rest.

It is conventional practice for airplanes to be designed for operation at what is termed an ideal air speed. Consequently after the pilot has brought his ship to this ideal speed he then should observe the position which the pointer 101 has taken with respect to the stationary dial 102. This will be a registration of his forward ground speed, as explained hereinabove. However, it may be that this registration occurs with the pointer 101 in some position other than the vertical, say for example, it might be pointing to "75." The operator should then manipulate the knob 113 in such a manner as to rotate the adjustable dial 106 until the numeral 75 is at the top (opposite the "0" of the stationary dial), and then before permitting the ship's speed to vary, the operator should, by the described manipulation of the push-rod 131, cause the gyro to precess until it comes to rest with the pointer in the corresponding position, i. e., the pointer will then be vertical with the result that the axis of spin of the rotor 52 also will be vertical; which, as explained, is its most advantageous position. Subsequently to this adjustment, the pilot should read his instrument by comparison of the position of the pointer 101 with respect to the outer, adjustable dial 106.

Whereas the dials 102 and 106 are calibrated only from "0" to "100," it is obvious, of course, that the instrument is equally effective in measuring speeds in excess of 100 M. P. H. For each 100 M. P. H. of attained velocity, the pointer makes one complete revolution, i. e., if the ship has acquired a speed of 325 M. P. H., the pointer will have turned through three and one quarter complete revolutions, coming to rest opposite the numeral 25 of the stationary dial. This, however, is not believed to be conducive to error, because the pilot should be able to judge the speed of his ship within 100 M. P. H. merely by the "feel" of his ship.

Operation of precession-retarding mechanism

In the embodiment of my invention chosen for illustration and description, the erecting mechanism is designed to operate in only one plane, i. e., to correct for movements of the gyro about only one of its gimbal axes, that axis being the minor gimbal axis. For this purpose orifices 79 are provided with their axes parallel to the minor gimbal axis only. This being the case, whenever air rushes through either of the orifices 79, the reaction which develops will produce an air-jet torque about the major gimbal axis, which causes the gyro to precess about the minor axis. When the axis of spin is accurately vertical, the two vanes 83 hang in such a manner that they intercept the jets issuing from both orifices 79 and thus paralyze the erecting mechanism. However, instantly any deviation of the axis of spin from vertical occurs about the minor gimbal axis, either one or the other of the vanes 83, depending upon the direction of such displacement, will swing out of registry with its associated orifice 79, whereupon the full reactive force of the associated jet will become operative upon the pendulous structure, developing an air-jet torque which causes the gyro to precess so as to return directly to the vertical, it being understood, of course, that the parts are so arranged that the precession is in the proper direction. This is the well known principle of operation of erecting mechanisms and is here recited for the purpose of emphasizing the sensitivity of the erecting mechanism to gravity.

It is a well understood fact that a gyro vertical is subject to certain acceleration errors when it employs means sensitive to gravity and normally covering the orifices of the erecting mechanism, but which are caused to move from their port-covering positions by gravity when the gyro deviates from its normal position. It is also a well understood fact that acceleration-error in a gyro vertical can be kept low by keeping low only the rate of the gyro's air-jet-produced precession; that is, the precession produced upon an uncovering of one of the orifices forming a part of the erecting mechanism. Hence, in order to promote accuracy, the rate of this precession must be kept low; in fact, the lower this rate the lower the acceleration error. There are three methods of reducing this rate, to-wit: by increasing the radius of gyration of the gyro rotor, by increasing the angular velocity of the gyro rotor, and by lessening the air-jet torque. Because of this, the radius of gyration and the angular velocity of the rotor are made as great as practicability will allow; and toward this same end, the air-jet torque is kept just as low as possible. But in the endeavor to keep this torque low, the designer is limited by the consideration that it must be of a value capable of producing precession; that is, in excess of the maximum frictional, resisting torque at the gimbal bearings. In fact, the erecting torque must be sufficiently great to make allowance for certain unpredictable variables, such as variation in frictional resistance due to temperature fluctuation and due to variation in operating conditions. In other words, in order to make the erecting mechanism fully dependable, its erecting torque must be materially in excess of not only the greatest frictional resisting torque apt to be encountered under ordinary operating conditions, but actually materially in excess of the greatest value that resistance could possibly assume under the most extraordinary conditions.

Consequently, in the device of the present invention the orifices 79 are so designed that the reactive force of the jets is materially in excess of the value that they must have in order to assure positive operation of the erecting mechanism even under the most unfavorable conditions. It is the incorporation of the rotating, notched discs 74 with the erecting mechanism, which, while reducing acceleration-error to a new low, permits such design of the orifices as to make for positive action. This is because whereas the discs do not interfere with the effectiveness of the jets during those periods when the notches 77 are in registry with the orifices 79, they do intercept the jets at other periods during which the jets impose force against the discs equal and opposite to the reactive force of the jets; and inasmuch as the discs are carried by the rotor-bearing casing, i. e., the same structure as that against which the reactive force is imposed, the jets are rendered inefficacious, at least as far as their ability to produce precession is concerned during the periods while the jets are intercepted. Accordingly, the rotating discs function to interrupt operation in the erecting mechanism at recurrent intervals, with the result that they operate to reduce the average rate of its operation, but not the force with which it operates. Therefore, operation of the erecting mechanism is amply positive so as to be fully dependable, and yet its rate of operation is decreased considerably with the result that errors due to acceleration are practically eliminated.

I claim:

1. A ground speed indicating instrument comprising a gyroscope, means supporting said gyroscope for movement about mutually perpendicular axes, said gyroscope being in substantially neutral equilibrium about one of said axes and in material pendulosity with respect to the other, means including valve control means sensitive to gravity for restricting movement of said gyroscope about said axis with respect to which it is pendulous, and means for measuring precessional movements of said gyroscope about said axis of neutrality.

2. A ground speed indicating instrument comprising a gyroscope, means supporting said gyroscope for movement about mutually perpendicular axes, said gyroscope being in substantially neutral equilibrium about one of said axes and in material pendulosity with respect to the other, erecting means for said gyroscope comprising control means mounted on said gyroscope for movement by gravity when said gyroscope moves about its said axis of pendulosity, means brought into action by movement of said control means for imposing an erecting torque, upon said gyro, and continuously operating means for interrupting said torque-imposing means at recurrent intervals and means for measuring precessional movements of said gyroscope about said axis of neutrality.

3. A ground speed indicating instrument comprising a gyroscope, means supporting said gyroscope for movement about mutually perpendicular axes, said gyroscope being in substantially neutral equilibrium about one of said axes and in material pendulosity with respect to the other, and means including valve control means sensitive to gravity for restricting movement of said gyroscope about said axis with respect to which it is pendulous.

4. A ground speed indicating instrument comprising a gyroscope having three mutually perpendicular axes of angular movement one being the axis of spin of the rotor of said gyroscope, a gimbal having a major and a minor axis providing the other two axes of angular movement, a support engaging said gimbal at said major axis, trunnions on said gyroscope above its center of gravity engaging said gimbal at said minor axis, a counterpoise on said gimbal above said major axis whereby said gyroscope and gimbals are supported in neutral equilibrium about said major axis and said gyroscope is in stable equilibrium about said minor axis, and an indicator actuated by precessions of said gyroscope about said major axis upon angular inertial movements of said gyroscope about said minor axis.

THOMAS O. SUMMERS, Jr.

Certificate of Correction

Patent No. 2,303,799.　　　　　　　　　　　　　　　　　　　　　　　December 1, 1942.

THOMAS O. SUMMERS, JR.

It is hereby certified that errors appear in the printed specification of the above numbered patent requiring correction as follows: Page 3, second column, line 11, for "wtih" read *with;* page 4, second column, line 38, for "low" read *law;* page 5, first column, line 23, strike out "(H)"; line 24, after the word and comma "integrating," insert the following—

$$v = \frac{\omega_s k}{Ml} \int \omega_p dt \qquad (H)$$

and that the said Letters Patent should be read with these corrections therein that the same may conform to the record of the case in the Patent Office.

Signed and sealed this 2nd day of February, A. D. 1943.

[SEAL]

HENRY VAN ARSDALE,
*Acting Commissioner of Patents.*